United States Patent [19]
Nishiwaki et al.

[11] Patent Number: 5,313,450
[45] Date of Patent: May 17, 1994

[54] OPTICAL DISK DRIVE

[75] Inventors: Seiji Nishiwaki, Osaka; Junichi Asada, Ibaraki; Shinji Uchida, Neyagawa, all of Japan

[73] Assignee: Matsushita Electric Industrial Co., Ltd., Osaka, Japan

[21] Appl. No.: 997,569

[22] Filed: Dec. 28, 1992

[30] Foreign Application Priority Data

Dec. 27, 1991 [JP] Japan .................................. 3-346029
May 27, 1992 [JP] Japan .................................. 4-134699

[51] Int. Cl.$^5$ .............................................. G11B 7/00
[52] U.S. Cl. ...................................... 369/124; 369/59
[58] Field of Search ............... 369/122, 112, 117, 118, 369/124, 59

[56] References Cited

U.S. PATENT DOCUMENTS

| | | | |
|---|---|---|---|
| 4,835,759 | 5/1989 | Saito et al. | 369/59 |
| 4,839,876 | 6/1989 | Fennema | 369/32 |
| 4,866,692 | 9/1989 | Saito et al. | 369/59 |
| 4,866,757 | 12/1989 | Fujita | 369/46 |
| 4,890,275 | 12/1989 | Mori | 369/59 |
| 4,954,903 | 9/1990 | Fuji et al. | 360/46 |
| 5,233,589 | 8/1993 | Saito et al. | 369/59 |

FOREIGN PATENT DOCUMENTS

| | | |
|---|---|---|
| 008358A2 | 1/1983 | European Pat. Off. . |
| 0181784A1 | 11/1985 | European Pat. Off. . |
| 0312214A1 | 9/1988 | European Pat. Off. . |
| 3604723 | 2/1986 | Fed. Rep. of Germany . |
| 58-064650 | 4/1983 | Japan . |
| 59-084319 | 5/1984 | Japan . |
| 60-107736 | 6/1985 | Japan . |
| 61-284876 | 12/1986 | Japan . |
| 63-247920 | 10/1988 | Japan . |
| 3-125330 | 5/1991 | Japan . |

OTHER PUBLICATIONS

Nikkei Electronics (No. 528, pp. 129-131 (1991)).

Primary Examiner—Paul M. Dzierzynski
Assistant Examiner—Kiet T. Nguyen
Attorney, Agent, or Firm—Wenderoth, Lind & Ponack

[57] ABSTRACT

In an optical disk drive which can reproduce signals of a high density, a laser beam emitted from a laser light source is converted to a parallel beam by a collimating lens, and is shaded by a shading member as to the light around the axis, and is converged by an objective lens on a signal plane of optical disk. The distribution of the laser beam is located on a ring belt just after the passage of an aperture plane of the optical system. The fed back light is collimated by the objective lens and shaded again by the shading member around the optical axis to reach a beam splitter. The light reflected by the beam splitter is transmitted through an optical system by a control signal detector, and focus signals and tracking signals on the signal plane of optical disk are detected. On the other hand, the light transmitted through the beam splitter is detected by a detector. A primary or secondary differential signal is derived from the detected signal, and the edges or the center of the signal marks are reproduced by using the differential signal.

9 Claims, 14 Drawing Sheets

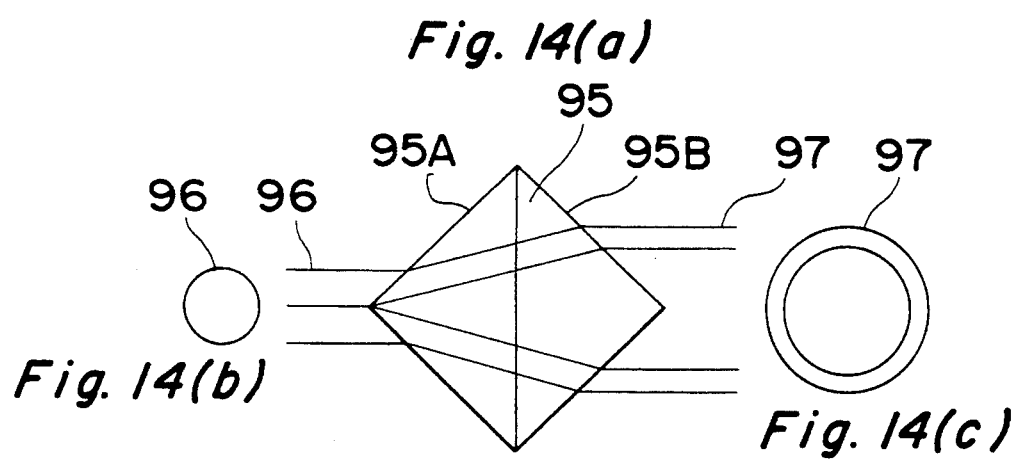

OPTICAL DISK DRIVE

BACKGROUND OF THE INVENTION

1. Field of the Invention

The present invention relates to an optical disk drive which can reproduce signals recorded on an optical disk.

2. Description of the Prior Art

Recently, there has been a desire to increase the signal density of optical disks and various approaches have been proposed. The diameter "D" of an optical spot converged on the signal surface of an optical disk can be expressed generally as follows:

$$D = 1.21\lambda/NA,$$

wherein $\lambda$ denotes the wavelength of a light source and NA denotes the aperture number of an objective lens. Therefore, a higher density can be attained by using a shorter wavelength light source consisting of a laser diode and a larger NA objective lens. At present, it is expected that the wavelength can be shortened down to 600 nm using a GaAs III-V compound, but it is difficult to shorten the wavelength further. The increase in NA also has problems such as the difficulty of the formation of the objective lens and errors which to occur due to the disk inclination and the defocusing.

A ring belt aperture has been proposed to increase the density as an approach for obtaining a higher NA. FIG. 1 shows an example of a prior art optical disk drive using a ring belt aperture, illustrated in NIKKEI ELECTRONICS (No. 528, 129 (1991)). In FIG. 1, a laser beam emitted from a light source 1 consisting of a laser diode is converted to a parallel beam, and transmitted through a beam splitter 3 and is shaded by a disk-like shading member 4 arranged near the optical axis and is converged on the signal plane 7 of an optical disk on the rear side of an optical disk substrate 6. The light reflected from the signal plane 7 is collimated by the objective lens 5, shaded again by the shading member 4 near the optical axis and reflected by the beam splitter 3 to reach another beam splitter 8. The light reflected by the beam splitter 8 is transmitted through an optical system 9 and is detected by a detector 10 which detects focus error signals and tracking error signals for the beam spot on the signal plane 7. On the other hand, the light transmitted through the beam splitter 8 is collimated by a converging lens 11, and is transmitted through a pin hole 12 to be received by a detector 13. The detected signal is amplified by an amplifier 14, and is converted to a reproduced signal by a signal processing circuit 15.

FIG. 2 shows a readout signal 17 detected by the detector 13 and a reproduced signal 18 in relation to signal marks 16a, 16b, 16c and 16d provided on the signal plane 7 of the optical disk. In the signal processing circuit 15, the readout signal 17 is compared with a detection level 17R, and determined to be 1 or 0 based on whether or not the readout signal 17 exceeds a detection level, and then the reproduced signal 18 is obtained.

FIG. 3(a) displays an effect of the insertion of the shading member 4 wherein the ordinate represents the light intensity and the abscissa represents the distance from the optical axis in the lateral directions ($\epsilon$- and $\eta$-axes). When the shading member 4 is inserted as shown in FIG. 1, the light just after the transmission of the aperture plane of the objective lens 5 has a shape of a ring belt. The light intensity distribution 19b on the focal plane (signal plane 7), shown in FIG. 3(a), is calculated for an NA=0.45–0.70 ring belt aperture and a 0.78 $\mu$m of wavelength. A light intensity distribution 19a with a circular aperture (NA=0.54) on the focal plane is shown for comparison. Because the aperture area is chosen to be the same, if the amount of light of the two cases are same, then the Strehl intensity (peak intensity) are the same. The distribution 19b for ring belt aperture has a smaller diameter of main lobe than the distribution 19a for circular aperture, while the former has a disadvantage that the side lobe rises. Therefore, if there are signal marks at the side lobe position, the effect thereof becomes large, so that cross talk and interference between signals arise strongly in the readout signals.

FIG. 3(b) illustrates an effect of the insertion of the pin hole 12. The optical intensity distribution 19c on the pin hole 12 shown in FIG. 3(b) corresponds to the light intensity distribution 19b for the ring belt aperture. Then, if the pin hole 12 allows only the main lobe of the converging light 19c to be transmitted through the pin hole 12, then the readout signal will not be affected by the signal marks located on the signal plane 7 on the side lobe positions of the conversion light 19b. Thus, cross talk and interference between signals can be decreased, and it is thought to be possible to reproduce high density signals.

Another effect of the insertion of the shading member 4 is that the focal depth becomes deeper. For example, a defocusing amount necessary to decrease the Strehl intensity by 20% is 0.70 $\mu$m for a circular aperture of NA=0.70 while is 1.14 $\mu$m for a ring belt aperture of NA=0.45–0.70 if the wavelength is 0.78 $\mu$m. Therefore, by using a ring belt aperture, one of the disadvantages accompanying a large aperture, that is, a shallow focal depth and bad effects on defocusing, can be avoided.

However, the above-mentioned prior art optical disk drive has problems in the reproduction of high density signals. In order to decide if the reproduction of high density signals can be possible, a determination is made as to how the signal mark patterns shown in FIGS. 8(a)–(d) are reproduced.

FIG. 4(a) shows a diagram of observation waveforms (eye patterns) of the readout signal 17 for the patterns shown in FIGS. 8(a) and 8(b) obtained by theoretical calculation, while FIG. 4(b) is a diagram of observation waveforms (eye patterns) of the readout signal 17 for the patterns shown in FIGS. 8(c) and 8(d). Further, FIG. 4(c) displays an eye pattern wherein a defocusing by 1.14 $\mu$m (of a degree such that the Strehl intensity of the beam spot decreases by 20%) is added on the reproduction of the patterns of FIGS. 8(a) and 8(b). An eye pattern is obtained as explained below with reference to FIGS. 10a–10c wherein the wavelength of the light source is 780 nm and the NA of the ring belt aperture is 0.45–0.70. The ordinate denotes a signal amplitude normalized by the detected light quantity (100) in a case that the signal plane 7 is a mirror plane, and the abscissa denotes the time corresponding to the scanning position of the beam spot. In FIG. 4(a) and 4(c), the diamond-like areas enclosing the x mark at the detection level (40), as represented by a reference sign "a", is called an eye. Because the 1 or 0 decision on the detection of signals is conducted by the comparison of the readout signal with the detection level, it is desirable that an eye is open both in the amplitude direction (in the vertical direction in the graphs) and in the time direction (in the horizontal direction in the graphs).

A first problem of the prior art optical disk drive is that cross talk and interferences between marks cannot be decreased by inserting the pin hole 12. It is confirmed from the results of the calculation that the existence of the pin hole 12 or the size of the pin hole 12 does not affect the eye patterns shown in FIGS. 4(a) and 4(b). (FIGS. 4(a) and 4(b) show the data without the pin hole 12.)

A second problem is that a large jitter "d" is generated due to the difference in pit patterns with adjacent tracks, as is clear from FIG. 4(a). Especially for the patterns of FIGS. 8(c) and 8(d), cross talk is very large, as shown in FIG. 4(b), and an eye 22A for the pit pattern shown in FIG. 8(c) and an eye 22B for the pit pattern shown in FIG. 8(d) are separated completely and an eye formed by the overlap of the eyes 22A and 22B is closed. That is, the signals cannot be reproduced.

A third problem is that as is clear from FIG. 4(c), an eye shifts largely upward by adding the defocusing, and jitter "d" at the detection level 40 is increased further. This tendency is common for other error factors as well as defocusing.

The generation of large jitter due to cross talk and defocusing makes it hard to reproduce high density signals by the prior art optical disk drive.

SUMMARY OF THE INVENTION

The present invention intends to solve the above-mentioned problems and its object is to provide an optical disk drive which can reproduce signals of a high density.

In an optical disk drive according to the present invention, a ring belt aperture is combined for reproduction with the primary or secondary differential of the readout signal. A laser beam from a laser light source is converged on a signal plane of an optical disk on which signal marks are formed. One or more optical components are arranged in the optical path between the laser light source and the optical disk for converging the distribution of the laser beam to a ring belt just after the passage of an aperture plane of the optical system. The light fed back from the optical disk is detected, and a signal processing circuit generates a secondary or primary differential signal by differentiating the detected signals and detects the edges or the center positions of the signal marks by comparing the secondary or primary differential signal with a detection level. Because the main lobe diameter of the converging light on the signal plane can be decreased by adopting the ring belt aperture, the inflection point of the readout signal waveform can correspond with the edges or center position of signal marks well, and the signal marks can be detected correctly by detecting the cross point of the secondary or primary differential signal with the detection level.

According to an optical disk drive of the present invention, signal marks of a high signal density of optical disk can be reproduced precisely and the signal density of optical disk can be increased to a large extent.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 14a–14c are diagrams of a conical body used for optical distribution of ring belt.

DESCRIPTION OF THE PREFERRED EMBODIMENTS

Figure 5:
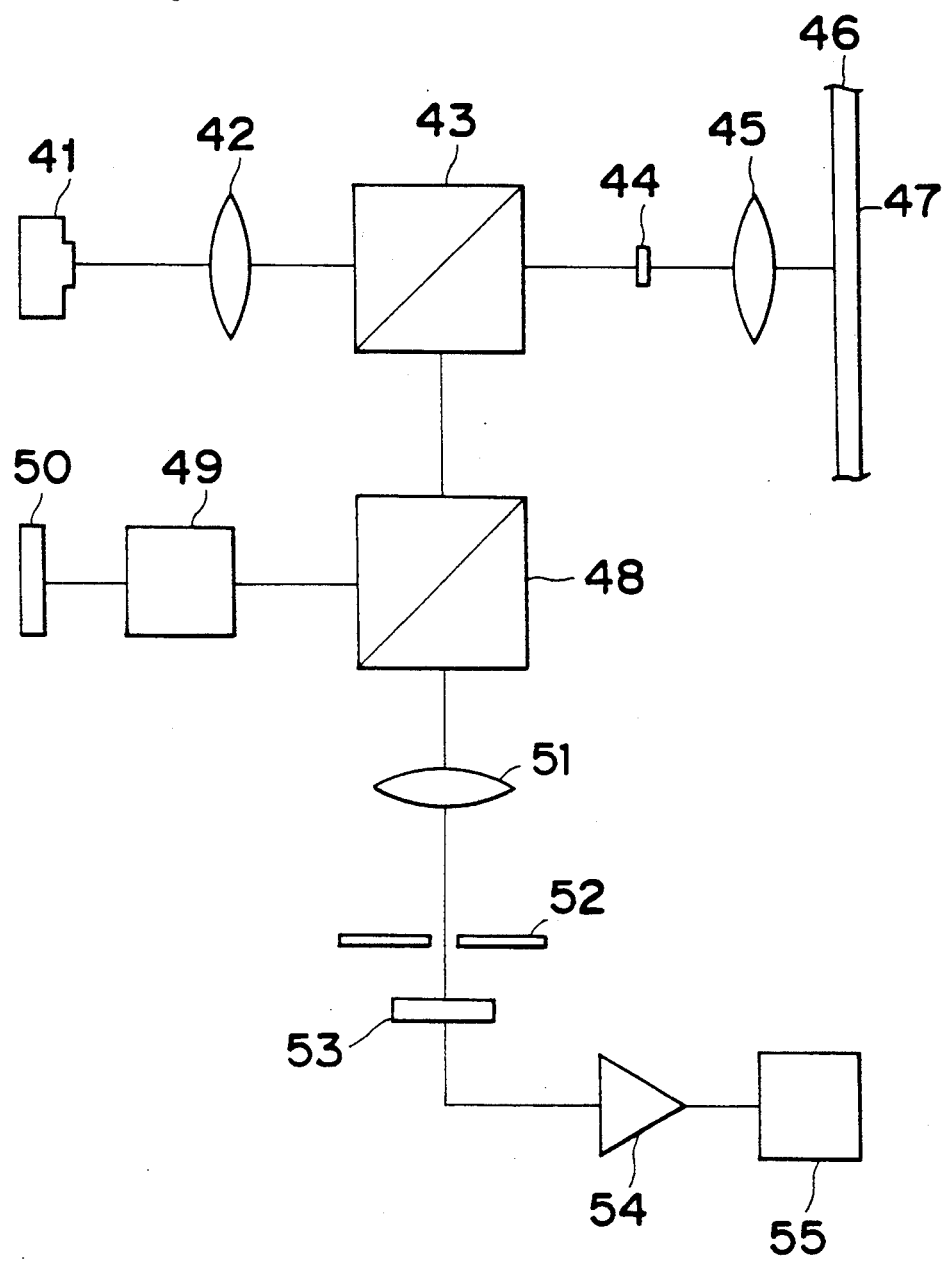
FIG. 5 is a diagram of the structure of an optical disk drive of a first embodiment of the present invention.

Embodiments of optical disk drives of the present invention will be explained below with reference to drawings, wherein like reference characters designate like or corresponding parts throughout the drawings. FIG. 5 shows the structure of an optical disk drive of a first embodiment of the present invention. In the optical disk drive, a laser beam emitted from a laser light source 41 is converted to a parallel beam by a collimating lens 42, and is transmitted through a beam splitter 43, and is shaded by a disk-like shading member 44 around the optical axis, and is converged by an objective lens 45 on a signal plane 47 of an optical disk at the rear surface of an optical disk substrate 46. The shading member 44 is used to realize a ring belt aperture, that is, to make the optical distribution just after the object lens a ring belt. The light fed back from the signal plane 47 is collimated by the objective lens 45, and is shaded again by the shading member 44 around the optical axis and is reflected by the beam splitter 43 to reach a beam splitter 48. The light reflected by the beam splitter 48 is transmitted through an optical system 49 and received by a detector 50 to detect control signals such as focus error signals and tracking error signals for the beam spot focused on the signal plane 47 of the optical disk. On the other hand, the light transmitted through the beam splitter 48 is collimated by a converging lens 51, and is transmitted through a pin hole 52 to be detected by a detector 53. The readout signal detected by the detector 53 is amplified by an amplifier 54 and a signal processing circuit 55 converts the readout signal 71 into a reproduced signal 78 by using the secondary differential of the readout signal, as explained in detail below.

Figure 6:
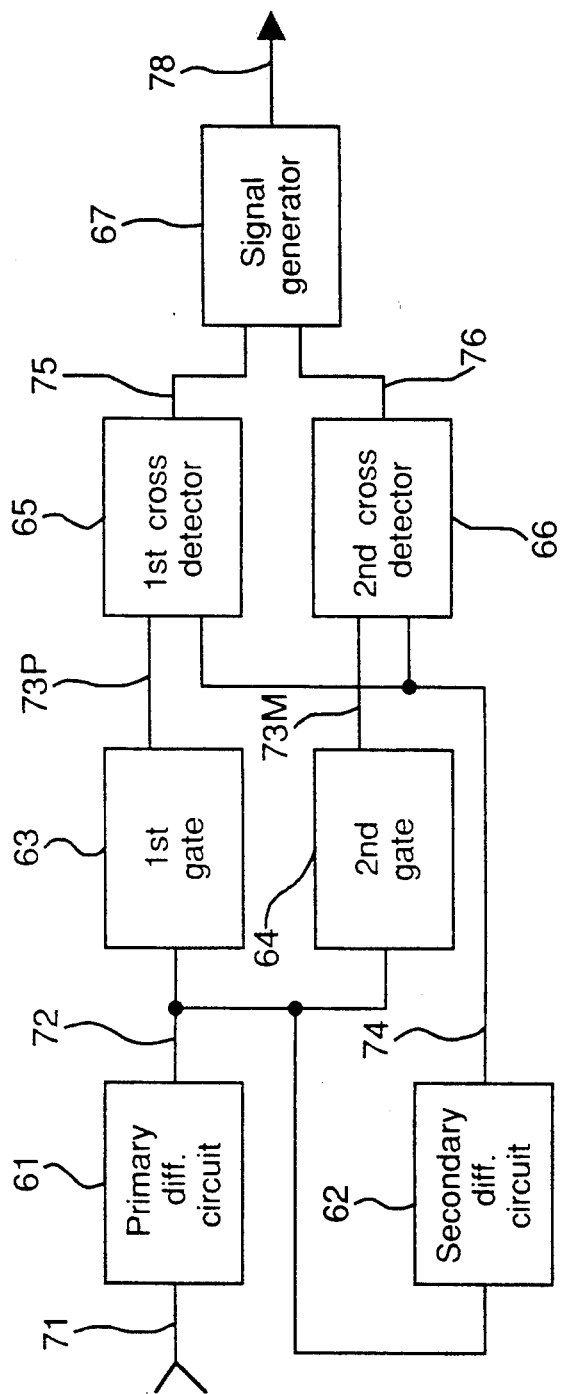
FIG. 6 is a block diagram of a signal processing circuit.

FIG. 6 is a block diagram of the signal processing circuit 55 wherein a primary differential circuit 61 generates a primary differential signal 72 of the readout signal 71 by differentiating the readout signal 71, while a secondary differential circuit 62 generates a secondary differential signal 74 of the readout signal by differentiating the primary differential signal 72 supplied from the primary differential circuit 61. The primary differential signal 72 is compared with an upper level 72P and with a lower level 72M in a first gate 63 and in a second gate 64, respectively. The first and second gates 63 and 64 generate pulses 73P and 73M when the primary differential signal 72 is higher than the upper level 72P and lower than the lower level 72M, respectively. Next, a first cross detector 65 and a second cross detector 66 generate pulses 75 and 76 when the second differential signal 74 crosses a detection level 74R when pulses 73P and 73M are received from the first and second gates 63 and 64, respectively. Then, a signal generator 67 generates pulses (reproduced signal) 78 which rise at the leading edge of the pulse 75 received from the first cross detector 63 and decrease at the trailing edge of the pulses 76 received from the second cross detector 64.

Figure 7:
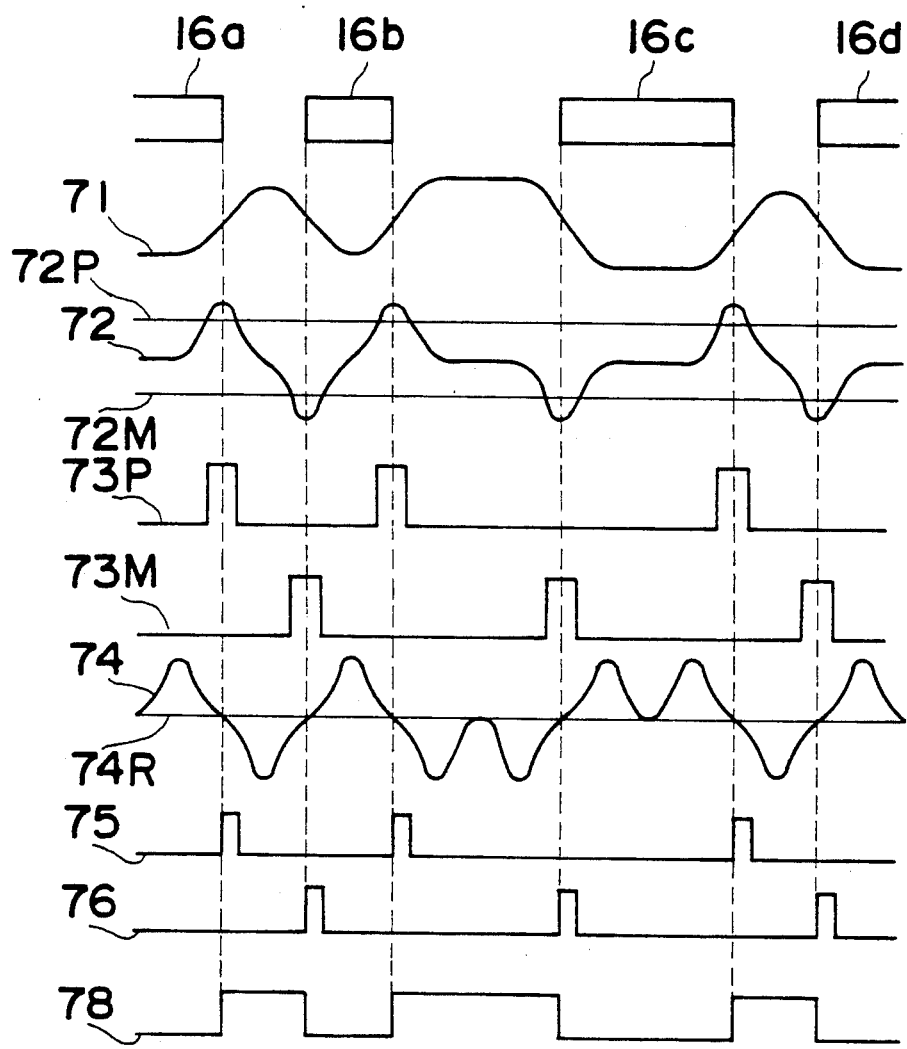
FIG. 7 is a diagram of the relationship of signal marks on the signal plane of optical disk with signals in the signal processing circuit.

FIG. 7 shows an example of the processing of the signal processing circuit 55 with relation to signal marks (pits) 16a, 16b, 16c and 16d on the signal plane 47 of the optical disk. The readout signal 71 for a signal mark is affected by the existence of neighboring signal marks. In this circuit 55, leading edges and trailing edges of signal marks can be detected correctly. A signal 72 is a primary differential waveform derived from the readout signal 71 by the primary differential circuit 61, and a signal 74 is a secondary differential waveform derived therefrom by the secondary differential circuit 62. A gate signal 73P is obtained by a first gate 63 by comparing the primary differential signal 72 with a detection level 72P, and in the gate signal 73P, a cross point of the secondary differential signal 74 with a detection level 74R is detected by the first cross detector 65. and a pulse signal 75 with a rising edge at the cross point is generated. The pulse signal 75 corresponds to a trailing edge of signal mark. Similarly, a gate signal 73M is obtained by the second gate 64 by comparing the primary differential signal 72 with a detection level 72M, and in the gate signal 73M, a cross point of the secondary differential signal 74 with a detection level 74R is detected by the second cross detector 66, and a pulse signal 76 with a rising edge at the cross point is generated. The pulse signal 76 corresponds to a leading edge of signal mark. Finally, the signal generator 67 generates a readout signal 78 as a signal inverting at the rising edges of the pulse signals 75 and 76, and it corresponds to the positions of the signal marks 16a-16d.

Figure 8A:
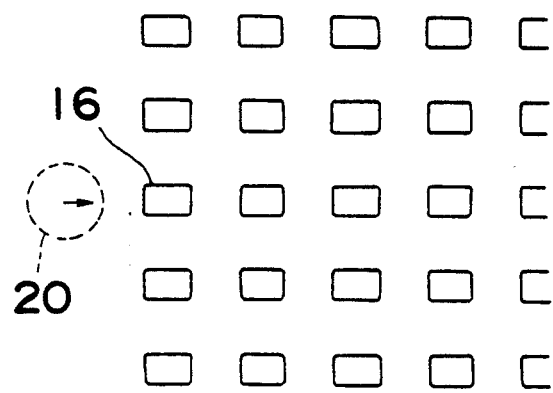
FIGS. 8(a), 8(b), 8(c) and 8(d) are diagrams of the patterns of signal marks of optical disk.
Figure 8B:
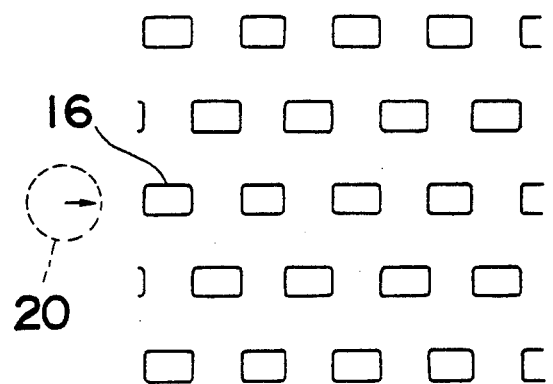
Figure 8C:
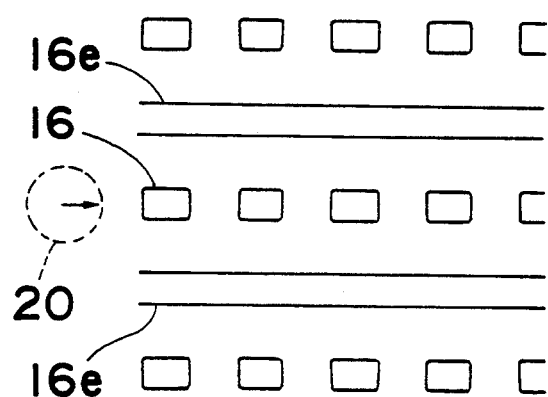
Figure 8D:
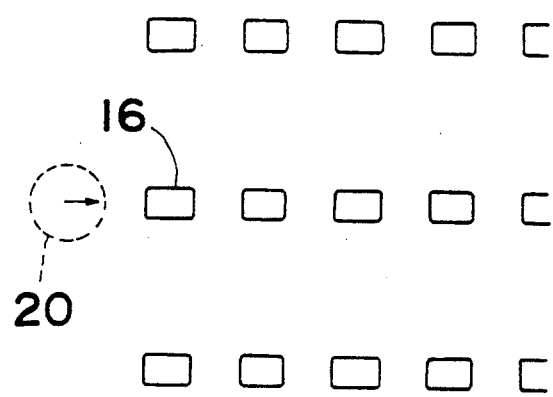

An explanation follows as to how the signal mark patterns displayed in FIGS. 8(a)-8(d) are read out. In FIGS. 8(a)-8(d), a laser spot 20 scans a track line (track pitch 0.8 μm) of pits 16 of mark length 0.45 μm aligned with a pitch of 0.9 μm. The signal density of the pattern is assumed to be four times that of a CD (compact disk). FIG. 8(a) shows a case of the synchronization of the pit pattern of the scanning track with those of adjacent tracks. FIG. 8(b) shows a case of the inverted synchronization or a case wherein the period of the scanning track is displaced by a half period compared with that of the adjacent tracks. FIG. 8(c) shows a case of the scanning track having adjacent tracks consisting of sufficiently long pits 16e. FIG. 8(d) shows a case of the scanning track having adjacent tracks with sufficiently long pit-to-pit distance.

Figure 9A:
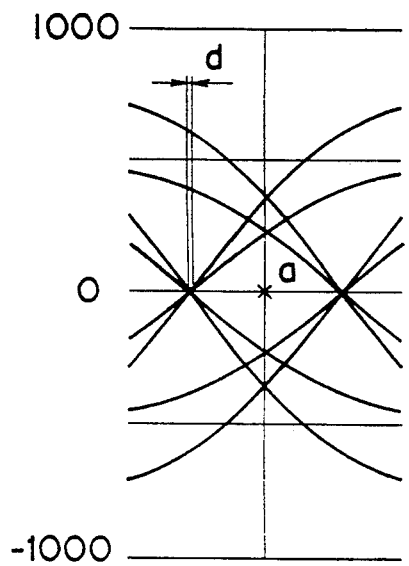
FIGS. 9(a), 9(b), 9(c) and 9(d) are diagrams of eye patterns of secondary differential signals in the first embodiment.
Figure 9C:
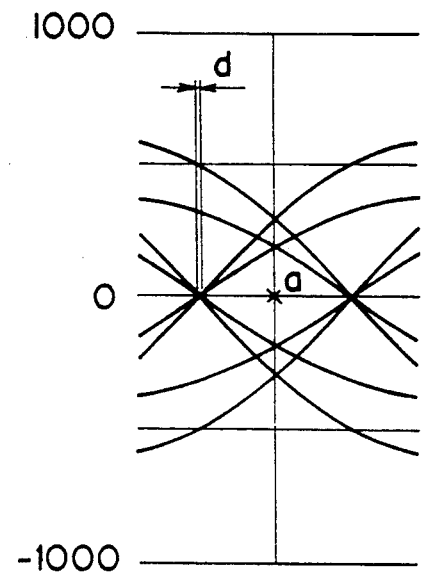
Figure 9B:
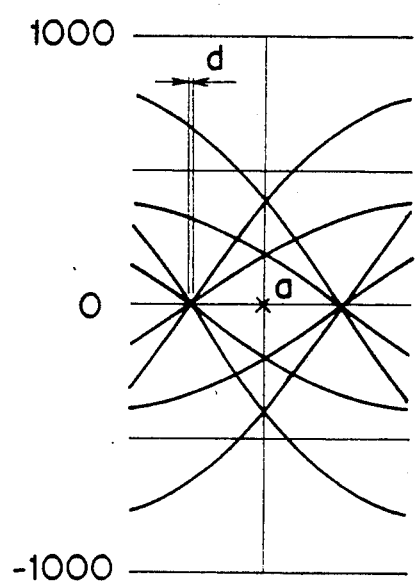

FIGS. 9(a) and 9(b) show observation waveforms (eye patterns) of secondary differential signal, drawn based on theoretical calculation, for 0.15 μm of clock frequency T in the signal detection. The wavelength of the light source is set to be 780 nm and the NA of the ring belt aperture is set to be 0.45-0.70. The ordinate denotes signal amplitude normalized by the detected light quantity (100) in a case when the signal plane is a mirror plane, and the abscissa denotes the time corresponding to the scanning position of the beam spot. In the drawings, the diamond-shape areas enclosing the x mark are called eyes.

Figure 9D:
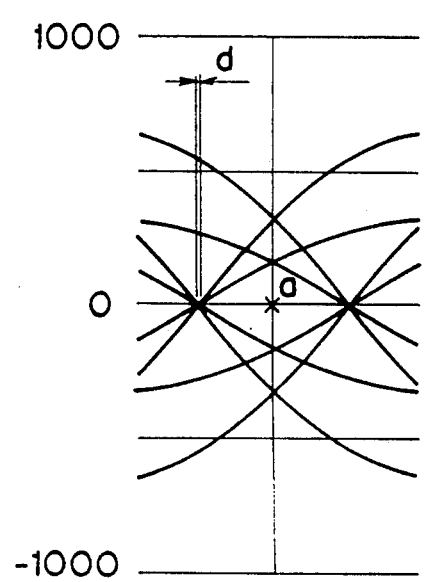
Figure 10A:
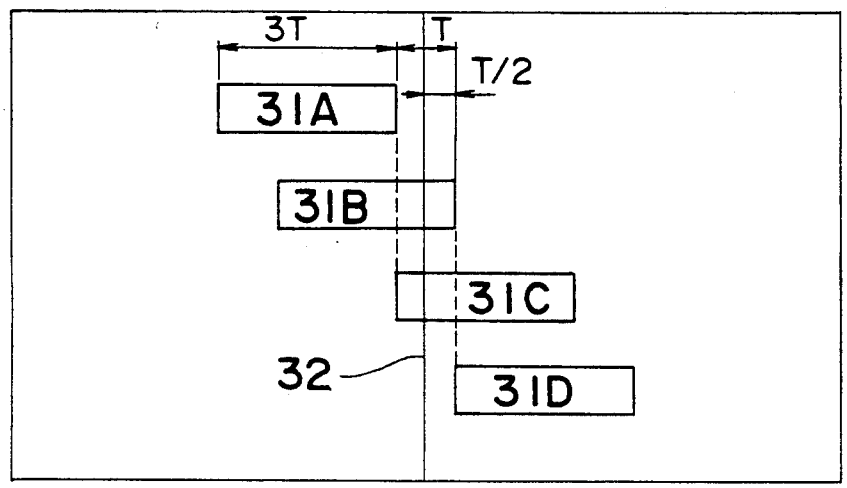
FIGS. 10a–10c are diagrams for explaining how an eye pattern is drawn.
Figure 10B:
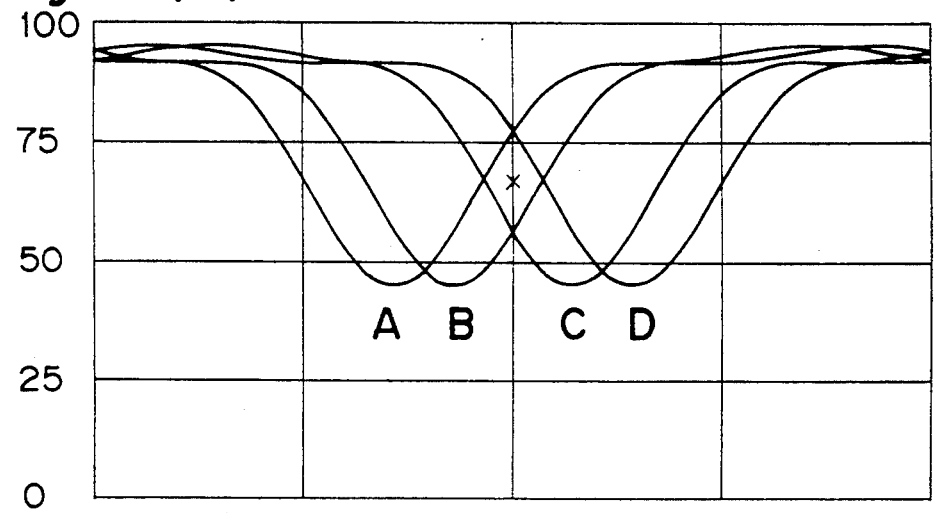
Figure 10C:
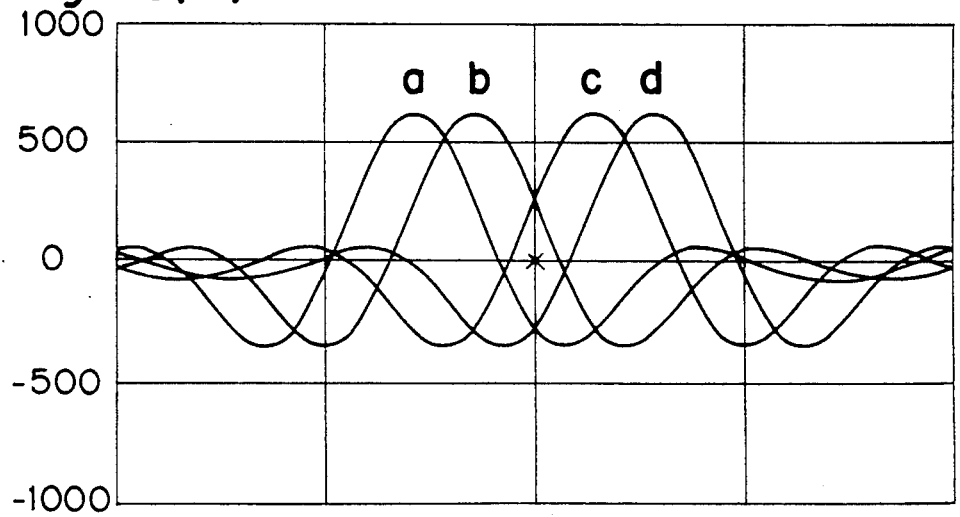

FIGS. 10a-10c illustrate how eye patterns are drawn in FIGS. 9(a)-9(d). As shown in FIG. 10a four signal marks 31A, 31B, 31C and 31D of pit length 3T having a mark edge distant by T/2 in the forward and backward directions from a synchronization position 32 are picked up as an example. Four signal waveforms A, B, C and D displayed in a graph in FIG. 10b are obtained when a laser spot scans four patterns, respectively, and an eye pattern is expressed by the superposition of four readout signals. The ordinate denotes signal amplitude normalized by the detected light quantity in a case when the signal plane is a mirror plane, and the abscissa denotes the time. Similarly, four signals a, b, c and d displayed in a graph in FIG. 10c obtained by differentiating the readout signals A, B, C and D secondarily, respectively, and an eye pattern signal is expressed by the superposition of four secondary differential signals a, b, c and d. An eye is the diamond-like are enclosed by the four waveforms A-D or a-d. The opening of an eye means that the waveforms A, B, C and D and a, b, c and d can be distinguished or 0 and 1 can be distinguished. Though the waveforms observed in the experiments are obtained by superposing the four waveforms A-D and a-d each with a shift of position in the lateral direction by an integral number times T, the waveforms are represented here without using the above-mentioned shifts, considering clear representation of signal waveforms.

FIG. 9(a) shows two eye pattern overlaps of the secondary differential signal of the two pit patterns shown in FIGS. 8(a) and 8(b). Similarly, FIG. 9(b) shows two eye pattern overlaps of the secondary differential signal of the two pit patterns shown in FIGS. 8(c) and 8(d). It is desirable for an eye to be open both in the amplitude direction (in the vertical direction in the graphs) and in the time direction (in the horizontal direction in the graphs). Further, it is desirable for the jitter "d" to be small. These are satisfied in FIGS. 9(a) and 9(b).

Further, FIGS. 9(c) and 9(d) show cases wherein 1.14 μm on defocusing (of the order of decreasing the Strehl intensity of focused spot by about 20%) is performed in the reproduction of the mark patterns of FIGS. 8(a) and 8(b) and of FIGS. 8(c) and 8(d), respectively.

Figure 4A:
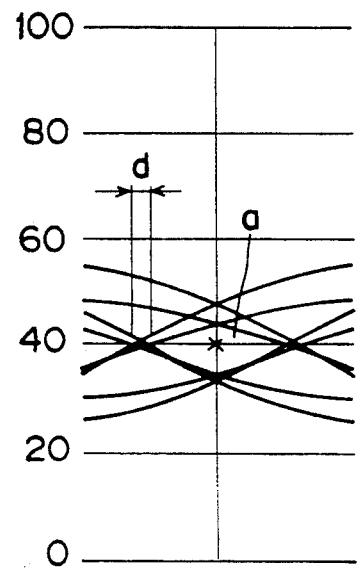
FIGS. 4(a), 4(b) and 4(c) are diagrams of eye patterns of readout signals in the prior art drive.
Figure 4C:
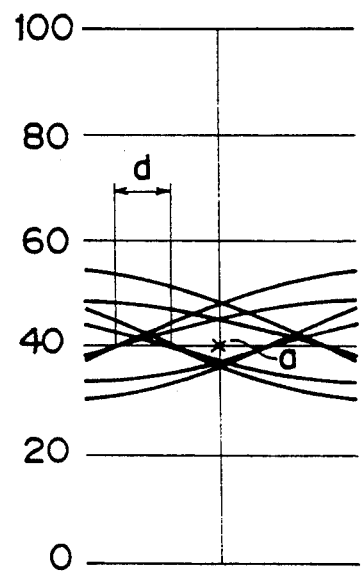
Figure 4B:
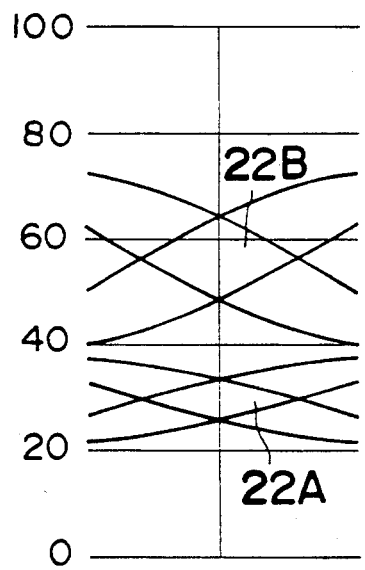

If FIG. 9(a) is compared with FIG. 4(a), the jitter "d" is found to become clearly smaller. Further, in FIG. 9(b), an eye is opened clearly in contrast to the closed eye in FIG. 4(b), and the jitter "d" is also much smaller. Further, as is clear from FIGS. 9(c) and 9(d), the eye does not shift upward or downward when the defocusing is added, and the jitter remains very small as in FIGS. 9(a) and 9(b). That is, signal marks can be detected correctly even in the presence of defocusing.

This tendency is common in cases of error factors other than defocusing.

Figure 1:
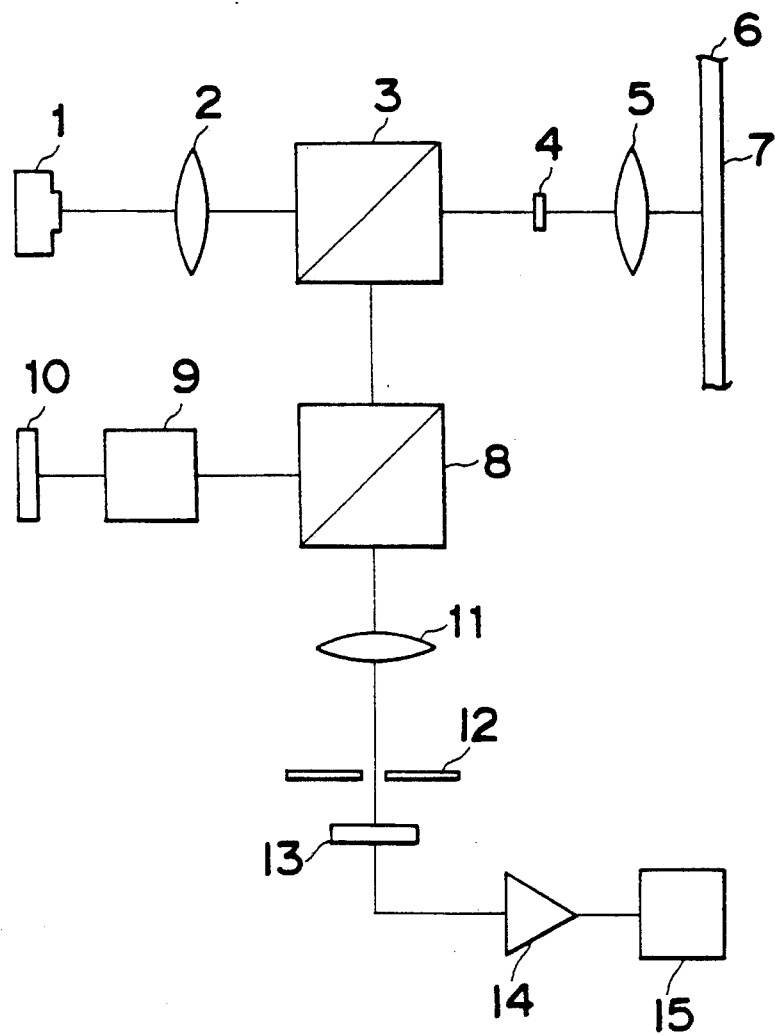
FIG. 1 is a diagram of the structure of a prior art optical disk drive.
Figure 2:
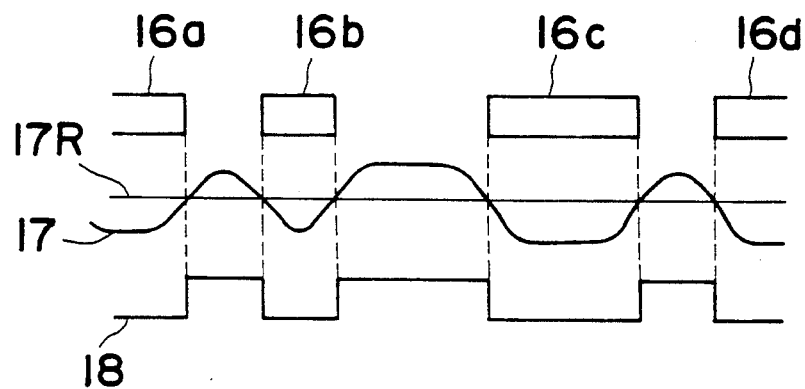
FIG. 2 is a diagram of the relationship between signal marks on the signal plane of optical disk and readout signals and the reproduced signals in the prior art drive.
Figure 3A:
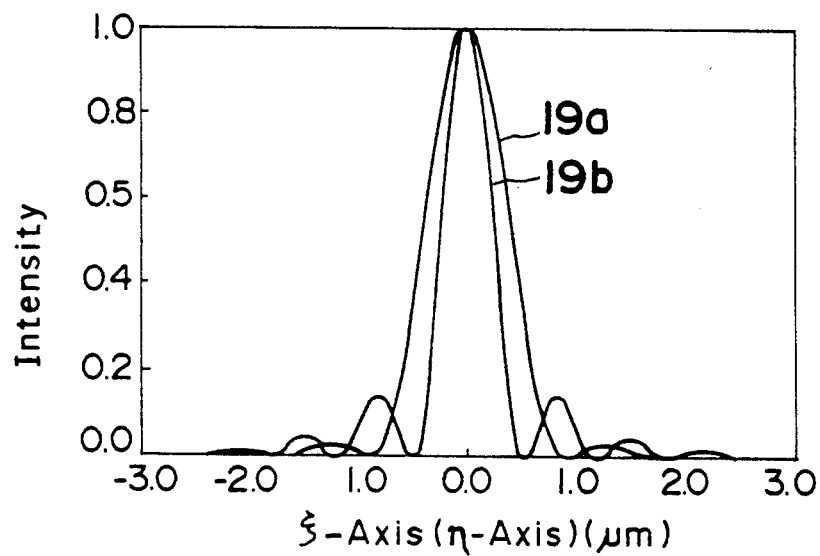
FIGS. 3(a) and (b) are diagrams for illustrating the effect of the insertion of a shading member and of a pin hole in the prior art drive.
Figure 3B:
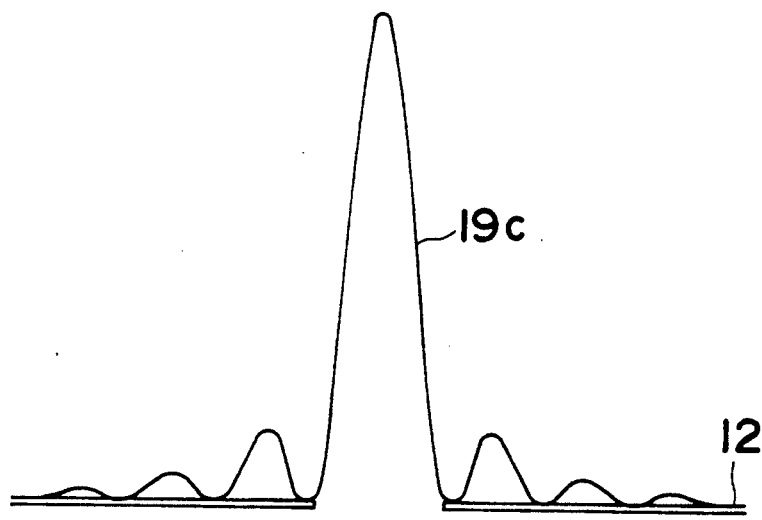

This can be explained as follows: As shown in FIG. 3(a), the beam spot focused, by a ring belt aperture has a large side lobe and a small main lobe diameter. The large side lobe intensity affects the readout signal in a DC component, or to the up or down as a whole, due to the interferences between marks. Error factors such as defocusing also affect the DC component of the readout signal. The DC component can be eliminated by using the differentiation of the readout signal. Therefore, an eye pattern due to secondary differential signal has a small jitter even if signal marks exist at the main lobe positions, and the jitter will not increase if other error factors are added. On the other hand, the smaller the, main lobe diameter is, the better the extreme point of the differential signal (that is, the inflection of readout signal) corresponds to edge positions of signal mark. Because the extreme point of the differential signal appears as a cross point of the secondary differential signal with a detection level, the cross point corresponds well with the edge position of signal mark. Thus, an advantage of the small side lobe diameter can be used in order to reproduce mark signals of high density.

Further, it is confirmed that the results of FIGS. 9(a) and 9(b) do not change by the existence of the pin hole 52 or the size of the pin hole 52 if any. (FIGS. 9(a) and 9(b) show the data without the pin hole.) The above-mentioned effect is same even if the pin hole 52 is omitted. (The merit of the pin hole 52 appears at different aspects such that the degradation of the signal detection characteristic is small when the signal plane is defocused.)

Figure 11:
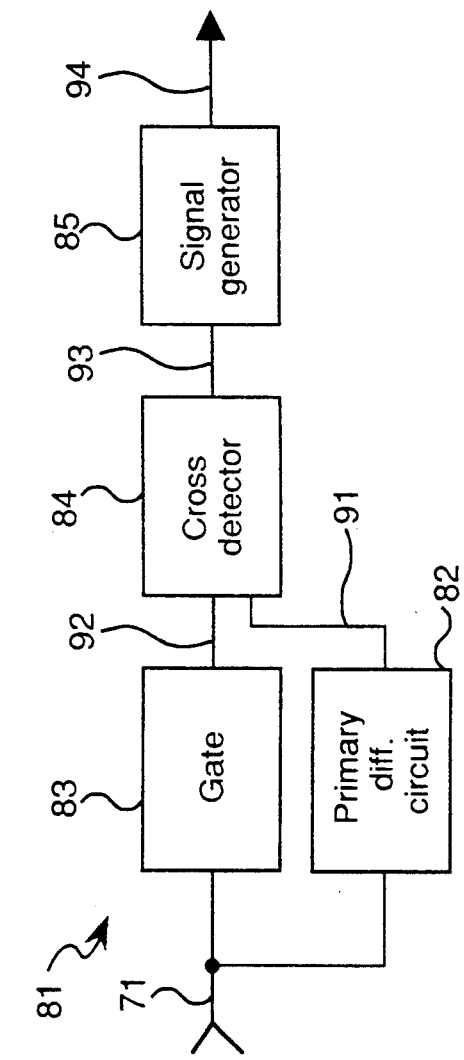
FIG. 11 is a block diagram of another signal processing circuit.

Next, another embodiment will be explained below wherein a primary differential signal of the readout signal is used. An optical disk drive according to the second embodiment is the same as that shown in FIG. 5 except a signal processing circuit 81 used instead of the signal processing circuit 55. FIG. 11 shows a block diagram of the signal processing unit 81. A primary differential circuit 82 generates a primary differential signal 91 of the readout signal 71 detected by the detector 53 by differentiating the readout signal 71. The readout signal 71 is compared with a detection level 92R in a gate 83. The gate 83 generates a pulse 92 when the readout signal 71 is lower than the detection level 92R. Next, a cross detector 84 generates a pulse 93 when the primary differential signal crosses a detection level 91R while the pulse 92 from the gates 83 is received. Then, a signal generator 85 generates a pulse which rises (or falls) at the leading edge of the pulse 93 received from the cross detector 84.

Figure 12A:
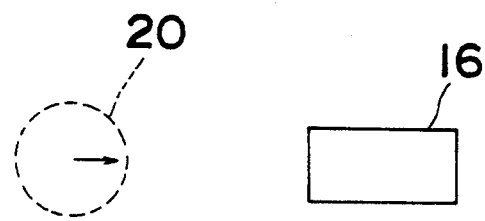
FIGS. 12a–12c are diagrams of the relationship of signal marks on the signal plane of optical disk with signals in the signal processing unit.
Figure 12B:
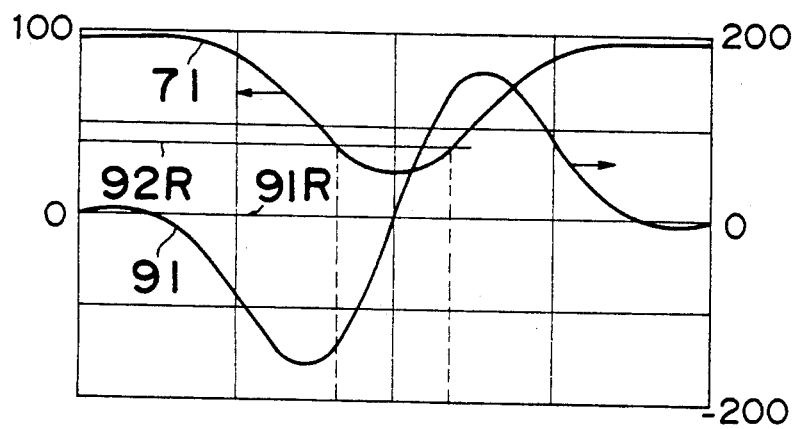
Figure 12C:
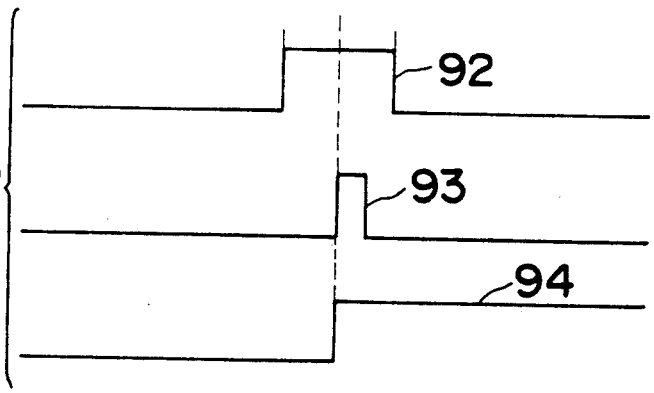

FIGS. 12a–12c show the relationship of signal marks on the signal plane of optical disk with the readout signal 71 and the reproduced signal 94. The readout signal 71 is changed while the beam spot 20 is scanning over a signal mark 16 of uniform length. In this circuit, the centers of the signal marks 16 can be detected. A signal 91 (right ordinate) is a waveform of primary differential of the readout signal 71 (left ordinate). A gate signal 92 is obtained by the gate 83 by comparing the readout signal 71 with a detection level 92R, and when the gate signal 92 is supplied, a cross point between the primary differential signal 91 and a detection level 91R is detected by the cross detector 84 while the pulse signal 93 rising with a starting point of the cross point is obtained. A reproduced signal 94 is obtained by the signal generator 85 as a signal inverted at the starting point of the pulse signal 93. This detection method is known as PPM (Pit Position Modulation), and the signal marks 16 have a uniform length. It is said that the effect of the errors of pit size on jitter in PPM is smaller than PWM (Pit Width Modulation) method such as EFM (Eight to Fourteen Modulation) used in CDs, and it is advantageous for an optical disk drive for readout/reproduction. In this embodiment, it is a feature that PPM is combined with a ring belt aperture.

Figure 13A:
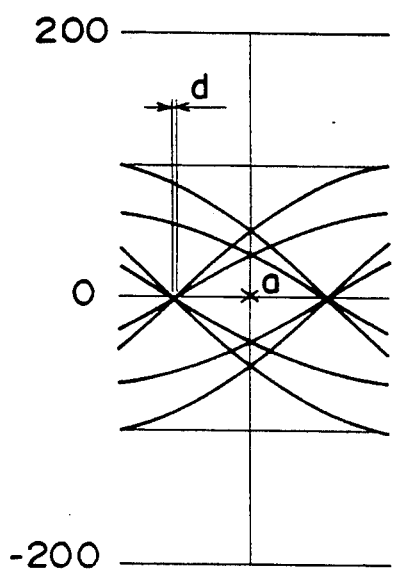
FIGS. 13(a), 13(b), 13(c) and 13(d) are diagrams of eye patterns of primary differential signals in the second embodiment.
Figure 13B:
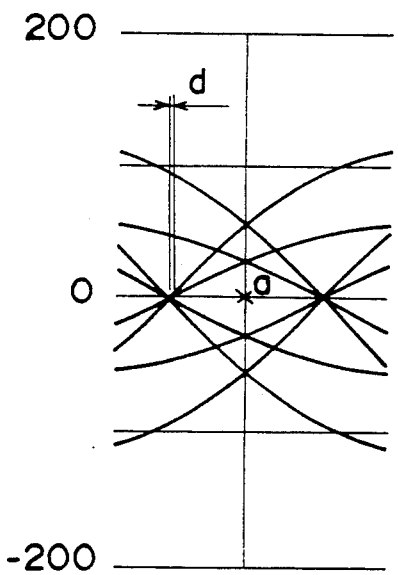
Figure 13C:
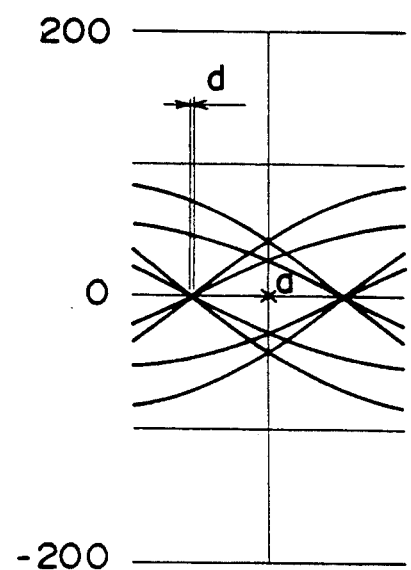
Figure 13D:
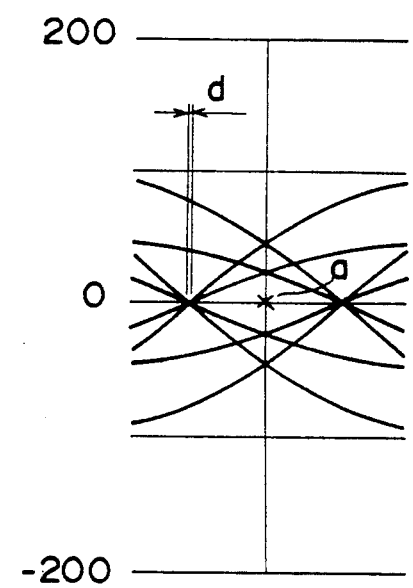

The following is an explanation of it is explained below how the signal mark patterns displayed in FIGS. 8(a)–8(d) are read out. FIG. 13(a) shows eye patterns of primary differential signal of the mark patterns of FIGS. 8(a) and 8(b), while FIG. 13(b) shows eye patterns of primary differential signal of the mark patterns of FIGS. 8(c) and 8(d), when the clock frequency T in the detection is 0.15 μm. The wavelength of the light source is set to be 780 nm and NA of the ring belt aperture is set to be 0.45–0.70. The ordinate denotes signal amplitude normalized by the detected light quantity (100) in a case when the signal plane is a mirror plane, and the abscissa denotes the time corresponding to the scanning position of the beam spot. An eye pattern is drawn similarly to in FIGS. 9(a)–9(d), but by using primary differential signals. In the drawings, the diamond-shape areas enclosing the x mark are called eyes. Further, FIG. 13(c) and 13(d) shows cases wherein 1.14 μm of defocusing (on the order of decreasing the Strehl intensity of beam spot by about 20%) is performed in the readout of the mark patterns of FIGS. 8(a) and 8(b) and of FIGS. 8(c) and 8(d), respectively. Similarly to FIGS. 9(a)–9(d), it is desirable for an eye to be open both in the amplitude direction (in the vertical direction in the graphs) and in the time direction (in the horizontal direction in the graphs). In FIGS. 13(a)–13(d), it is clear that eyes are open and the jitter "d" is very small as in FIGS. 9(a)–9(d), in contrast to FIGS. 4(a)–4(c).

This can be explained as follows: As shown in FIG. 3(a), a ring belt aperture has a large side lobe and a small main lobe diameter. The large side lobe intensity affects the readout so as to add a DC component, or in the up or down as a whole, due to the interferences between marks. Error factors such as defocusing also affects the readout signal so as to add a DC component. The DC component can be eliminated by using the differentiation of the readout signal. Therefore, an eye pattern due to primary differential signal has a small jitter if signal marks exist at the side lobe positions, and the jitter will not increase if other error factors are added. On the other hand, the smaller the main lobe diameter is, the better the extreme point of the readout signal corresponds to a central position of signal mark. Because the extreme point of the readout signal appears as a cross point of the primary differential signal with a detection level, the cross point corresponds well with the center position of signal mark. Thus, an advantage of the small main lobe diameter can be used to reproduce signals of a high density.

Further, similarly to in the first embodiment, it is confirmed that the results of FIG. 13(a) and 13(b) do not change by the existence of the pin hole 52 or the size of the pin hole 52 if any. (FIGS. 13(a) and 13(b) show the data without the pin hole 52.) The above-mentioned effect is same even if the pin hole is omitted.

In the above-mentioned embodiments, the shading member 44 is used for realizing a ring belt aperture. However, a ring-belt-like optical distribution can be realized in different ways. For example, as shown in FIGS. 14a–14c, a transparent conical body 95 defined by a pair of conical planes 95A and 95B can be used. Then, when a light 96 of flat wave front of circular distribution (refer the cross section shown in FIG. 14b) is incident along the central axis of the conical body 95, the light 96 is refracted at the conical planes 95A and 95B to be converted to a light 97 of flat wave front of ring-belt-like distribution (refer the cross section shown in FIG. 14c.

In the above-mentioned embodiments, the shading member 44 is put between the beam splitter 43 and the objective lens 45. However, it may be put between the collimating lens 42 and the beam splitter 43. In this case, the conversion onto the signal plane 47 of optical disk is carried out with a ring belt aperture, while the detection of fed back light is carried out with a circular aperture. Thus, the detection characteristic is different from the above-mentioned embodiments. However, the principle is the same in a point that high density signals can be reproduced by using a combination of the secondary or primary differential of the readout signal and a ring belt aperture.

Further, in the above-mentioned embodiments, the optical system including bulk optical components such as lens and prism is used. However, other collimating elements such as grating lens and focusing grating coupler make the reproduction of high density signals possible when combined with the secondary or primary differential.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. An optical disk drive comprising:
   a laser light source for emitting a laser beam;
   an optical system for converging the laser beam from the laser light source on a signal plane of an optical disk on which signal marks are formed and for transmitting a light reflected from the signal plane;
   at least one optical component, arranged in the optical path between the laser light source and the optical disk, for converging the distribution of the laser beam by the optical system into a ring belt located just after the passage of an aperture plane of the optical system;
   a detection means for detecting the light reflected from the optical disk and for producing a signal; and
   a signal processing circuit for generating a primary differential signal and a secondary differential signal by differentiating the signal detected by the detection means and for detecting the edge positions of the signal marks by comparing the secondary differential signal with a detection level.

2. The optical disk drive according to claim 1, wherein said signal processing circuit comprising:
   a differentiating means for generating the primary differential and the secondary differential of the readout signal detected by said detection means;
   a first gate which opens when the primary differential signal exceeds a higher gate level;
   a second gate which opens when the primary differential signal exceeds a lower gate level; and
   a crossing detector means for detecting the cross point of the secondary differential signal with the detection level when the first or second gate is open.

3. The optical disk drive according to claim 1, wherein said at least one optical component is a shading member arranged near the optical axis around the aperture plane of said optical system.

4. The optical disk drive according to claim 1, wherein said at least one optical component is a transparent conical body arranged near the optical axis around the aperture plane of said optical system.

5. An optical disk drive comprising:
   a laser light source for emitting a laser beam;
   an optical system for converging the laser beam from the laser light source on a signal plane of an optical disk on which signal marks are formed and for transmitting a light reflected from the signal plane;
   at least one optical component, arranged in the optical path between the laser light source and the optical disk, for converging the distribution of the laser beam by the optical system into a ring belt located just after the passage of an aperture plane of the optical system;
   a detection means for detecting the light reflected from the optical disk and for producing a signal; and
   a signal processing circuit for generating a primary differential signal by differentiating the signal detected by the detection means and for detecting the center positions of the signal marks by comparing the primary differential signal with a detection level.

6. The optical disk drive according to claim 5, wherein the size of signal marks is uniform.

7. The optical disk drive according to claim 5, said signal processing circuit comprising:
   a differentiating means for generating the primary differential of the readout signal detected by said detection means;
   a gate which opens when the primary differential signal exceeds a higher gate level; and
   a means for detecting the cross point of the primary differential signal with the detection level when the gate is open.

8. The optical disk drive according to claim 5, wherein said at least one optical component is a shading member arranged near the optical axis around the aperture plane of said optical system.

9. The optical disk drive according to claim 5, wherein said at least one optical component is a transparent conical body arranged near the optical axis around the aperture plane of said optical system.

* * * * *